United States Patent
Bae et al.

(10) Patent No.: US 11,552,316 B2
(45) Date of Patent: Jan. 10, 2023

(54) HYDROGEN SUPPLY CONTROL METHOD AND SYSTEM OF FUEL CELL SYSTEM

(71) Applicants: Hyundai Motor Company, Seoul (KR); Kia Motors Corporation, Seoul (KR)

(72) Inventors: Ho June Bae, Seoul (KR); Hyeon Seok Ban, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 687 days.

(21) Appl. No.: 16/405,279

(22) Filed: May 7, 2019

(65) Prior Publication Data

US 2020/0185743 A1    Jun. 11, 2020

(30) Foreign Application Priority Data

Dec. 11, 2018  (KR) .................. 10-2018-0158783

(51) Int. Cl.
*H01M 8/04746* (2016.01)
*H01M 8/0438* (2016.01)
*H01M 8/04082* (2016.01)

(52) U.S. Cl.
CPC ... *H01M 8/04753* (2013.01); *H01M 8/04201* (2013.01); *H01M 8/04388* (2013.01); *H01M 2250/20* (2013.01)

(58) Field of Classification Search
CPC ......... H01M 8/04753; H01M 8/04201; H01M 8/04388; H01M 2250/20
See application file for complete search history.

(56) References Cited

U.S. PATENT DOCUMENTS

| | | | | |
|---|---|---|---|---|
| 2010/0151287 A1* | 6/2010 | Chowdhury | ...... | H01M 8/04761 429/444 |
| 2012/0141891 A1* | 6/2012 | Kwon | ............... | H01M 8/04097 429/415 |
| 2012/0276460 A1* | 11/2012 | Kumei | .............. | H01M 8/04432 429/429 |
| 2012/0315559 A1* | 12/2012 | Noh | .................... | F02M 63/0017 429/444 |
| 2015/0030948 A1* | 1/2015 | Ikezoe | .............. | H01M 8/04231 429/415 |
| 2017/0301931 A1* | 10/2017 | Jung | .................. | H01M 8/04302 |

FOREIGN PATENT DOCUMENTS

KR    20160059254 A    5/2016

OTHER PUBLICATIONS

KR20120061196 (Abstract) (Year: 2012).*

* cited by examiner

*Primary Examiner* — Alexander Usyatinsky
(74) *Attorney, Agent, or Firm* — Fox Rothschild LLP (57) ABSTRACT

A hydrogen supply control method of a fuel cell system is provided. The method includes measuring the pressure of a front line of a supply line having relatively low humidity and the pressure of a front end of an ejector, without a pressure sensor of an anode. The amount of supplied hydrogen is then adjusted using the measured pressure and the pressure of the anode is estimated more accurately.

9 Claims, 4 Drawing Sheets

HYDROGEN SUPPLY CONTROL METHOD AND SYSTEM OF FUEL CELL SYSTEM

CROSS-REFERENCE TO RELATED APPLICATION

This application claims under 35 U.S.C. § 119(a) the benefit of priority to Korean Patent Application No. 10-2018-0158783 filed on Dec. 11, 2018, the entire contents of which are incorporated herein by reference.

BACKGROUND

(a) Technical Field

The present disclosure relates to a hydrogen supply control method and system of a fuel cell system, and more particularly, to a method of controlling the amount of hydrogen supplied to an anode of a fuel cell vehicle.

(b) Background Art

A fuel cell stack as a main component of a fuel cell system is a power generation device which generates electric energy by chemical reaction between oxygen in the air and hydrogen supplied from the outside. Such a fuel cell system may be used in the industry and home and particularly may be used as a power supply source for supplying power to drive a vehicle.

A fuel cell system applied to a fuel cell vehicle includes a fuel cell stack that generates electric energy from electrochemical reaction between reaction gases (e.g., hydrogen as fuel and oxygen as an oxidizing agent), a hydrogen supply device that supplies hydrogen to the fuel cell stack as fuel, an air supply device that supplies air including oxygen to the fuel cell stack, a heat and water management system that adjusts the operation temperature of the fuel cell stack and performs a water management function, and a fuel cell controller that executes overall operation of the fuel cell system.

In a general fuel cell system, a hydrogen supply device includes a hydrogen storage unit (e.g., hydrogen tank), a regulator, a hydrogen pressure control valve, a hydrogen recirculation device, etc., the air supply device includes an air blower, a humidifier, etc., and the heat and water management system includes a cooling water pump, a water tank, a radiator, etc. Meanwhile, in the stack of the fuel cell system, water is generated as a result of reaction between hydrogen and oxygen. When the generated water accumulates in the stack, performance of the fuel cell system may deteriorate due to the water remaining in the stack. To prevent performance deterioration of the fuel cell stack, a condensate water reservoir and a drain valve for removing condensate water are provided.

In addition, in the stack, nitrogen in a cathode crosses over into an anode through an electrolyte membrane, thereby decreasing the concentration of hydrogen in the anode. Accordingly, to maintain the concentration of hydrogen in the anode, an exhaust valve referred to as a purge valve is installed on a fuel recirculation line side and gas of the anode is periodically exhausted through the exhaust valve. When hydrogen is supplied in the fuel cell system, the amount of supplied hydrogen is adjusted through pressure control of the anode. Accordingly, for pressure control, the anode requires a pressure sensor.

The hydrogen supply device includes a device such as an injector or an ejector to supply hydrogen to the fuel cell stack. When the injector is used, a space having the same pressure as the stack and having low humidity may be configured at the rear end of the injector, and a pressure sensor may be installed in the space to measure the pressure of the anode. Meanwhile, unlike the injector, in a hydrogen supply device that includes an ejector, recirculated hydrogen is introduced into the ejector and supplied to a stack and thus all portions having the same pressure as the stack are exposed to gas having high humidity. The pressure sensor used in a humid environment has a complex structure capable of enduring the humid environment of the anode and the manufacturing cost of the pressure sensor increases.

SUMMARY

Since an anode is in a humid environment, when the outside temperature is low when a fuel cell system is stopped, water condensation/freezing occurs. When a general sensor is used, the measured value of the pressure sensor may be adversely affected and a measurement unit may be damaged in severe cases, thereby causing a problem in supply of hydrogen when the fuel cell system operates. Accordingly, the present invention provides a technology capable of efficiently performing hydrogen supply control without additionally installing a pressure sensor on an anode.

In order to achieve the above object, the present disclosure provides a method of measuring the pressure of a front line of a supply line having relatively low humidity and, preferably, the pressure of a front end of an ejector, without a pressure sensor of an anode, adjusting the amount of supplied hydrogen using the measured pressure, and more accurately estimating the pressure of the anode.

In one aspect, a hydrogen supply control method of a fuel cell system having a hydrogen supply valve, a hydrogen spraying device, a controller configured to open and close the hydrogen supply valve, and a pressure sensor configured to measure pressure between a rear end of the hydrogen supply valve and a front end of the hydrogen spraying device may include determining a measured value of the pressure sensor in a state of blocking the hydrogen supply valve as an estimated pressure value of an anode, determining target pressure of the anode based on required output of the fuel cell system, calculating an amount of hydrogen required to be supplied to the anode from a difference between the target pressure of the anode and the estimated pressure value of the anode, adjusting an opening degree of the hydrogen supply valve based on the calculated amount of hydrogen required, and updating the estimated pressure value of the anode, by newly calculating the estimated pressure value of the anode from the measured value of the pressure sensor and a time elapsed after the hydrogen supply valve is opened.

In an exemplary embodiment, when the fuel cell system is operating, the determining of the target pressure of the anode to the updating of the estimated pressure value of the anode may be repeatedly performed. In addition, data regarding the amount of hydrogen supplied to the anode based on the pressure between the rear end of the hydrogen supply device and the front end of the hydrogen spraying device may be stored in the controller. The adjusting of the opening degree of the hydrogen supply valve may include adjusting the opening degree of the hydrogen supply valve to adjust the pressure of the front end of the hydrogen spraying device such that the pressure value corresponding to the calculated amount of hydrogen required corresponds to the measured value of the pressure sensor, based on the data.

The hydrogen supply control method may further include comparing the measured value of the pressure sensor with the estimated pressure value of the anode and updating the data based on a difference between the measured value of the pressure sensor and the estimated pressure value of the anode, when a predetermined time has elapsed in a state of closing the hydrogen supply valve.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A fuel cell system produces electricity through electrochemical reaction between hydrogen supplied to an anode and oxygen included in air supplied to a cathode. At this time, it is important to adjust the amount of hydrogen supplied to the anode according to the required output of an operator.

Figure 1:
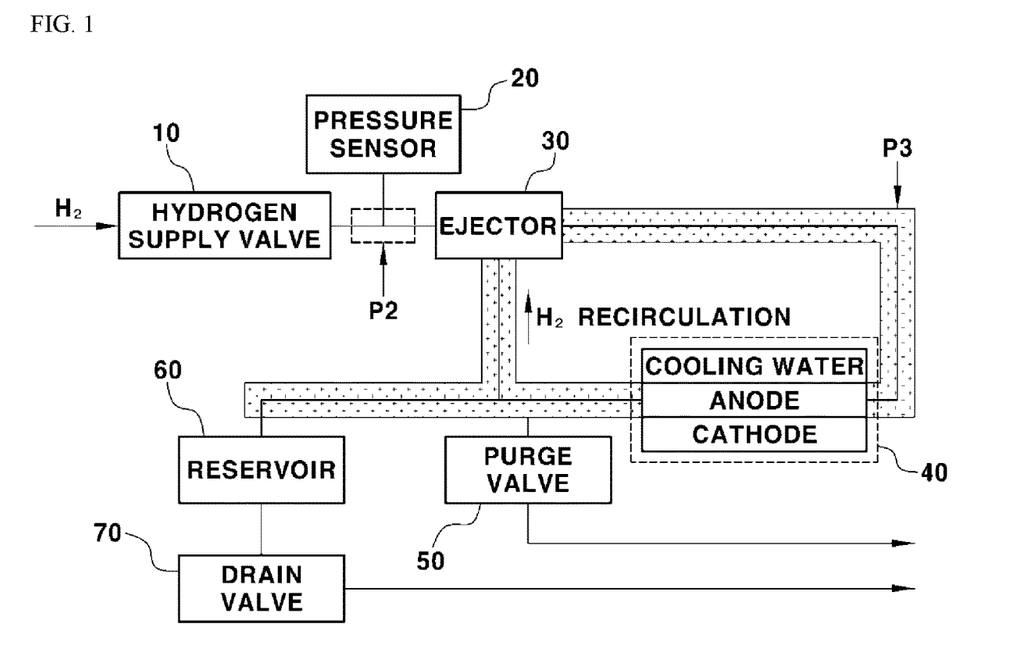
FIG. 1 is a schematic diagram showing a hydrogen supply system of a fuel cell system according to an exemplary embodiment of the present disclosure.

FIG. 1 is a schematic diagram showing a hydrogen supply system of a fuel cell system. FIG. 1 shows a fuel cell system in which an ejector 30 is installed on the rear end of a hydrogen supply valve 10 as a hydrogen spraying device. The ejector 30 is configured to supply hydrogen to the anode side of the fuel cell. Hereinafter, although the ejector 30 is used as the hydrogen spraying device in the present specification, this is merely an example and another hydrogen spraying device is applicable instead of the ejector 30.

Meanwhile, gas discharged from the anode may be discharged to the outside through a purge valve 50 and some of the gas may be recirculated to the ejector 30 and resupplied to the anode. In addition, the condensate water of the anode may be stored in a reservoir 60 and discharged to the outside through a drain valve 70 based on the water level of the reservoir 60.

In the system including the hydrogen supply valve 10 and the ejector 30, the amount of supplied hydrogen may generally be adjusted through pressure control of the anode. The target pressure of the anode may be determined based on the output of a fuel cell stack 40, and the pressure of the anode may be measured directly, and thus, the amount of supplied hydrogen may be adjusted based on a difference between the target pressure and the measured pressure.

For example, when the measured pressure is less than the target pressure, the opening degree of the hydrogen supply valve 10 may be increased to supply hydrogen, thereby increasing the measured pressure to the target pressure. In contrast, when the measured pressure is greater than the target pressure, the opening degree of the hydrogen supply valve 10 may be decreased to reduce or stop supply of hydrogen, thereby decreasing the measured pressure to the target pressure. However, as described above, when the pressure sensor is installed on the rear end of the ejector 30 to directly measure the pressure of the anode, the amount of supplied hydrogen may be accurately adjusted, but the pressure sensor may be exposed to a humid environment.

In an exemplary embodiment of the present invention, the pressure sensor configured to directly measure the pressure of the anode is not installed on the rear end of the ejector 30. As shown in FIG. 1, a pressure sensor 20 may be installed on the front end of the ejector 30 and the rear end of the hydrogen supply valve 10. The amount of supplied hydrogen may be determined by the pressure value measured by the pressure sensor 20, and the opening degree of the hydrogen supply valve 20 may be adjusted based on the determined amount of supplied hydrogen.

FIG. 1 mainly shows the hydrogen supply system in the fuel cell system. Specifically, high-pressure hydrogen gas stored in a pressure vessel (not shown) may be supplied to the anode side through the ejector 30 based on whether the hydrogen supply valve 10 is opened.

According to the present exemplary embodiment, the pressure sensor 20 may be installed between the hydrogen supply valve 10 and the ejector 30 and the pressure value measured by the pressure sensor 20 may be used as a parameter for determining the amount of supplied hydrogen. In addition, although not shown, the fuel cell system of FIG. 1 may include a controller configured to open and close the hydrogen supply valve 10. The controller may be configured to determine the amount of hydrogen supplied to the anode by adjusting the opening degree of the hydrogen supply valve 10. The controller may also be configured to determine the target pressure of the anode based on the required output of the system and to estimate the current pressure of the anode to determine the amount of hydrogen to be supplied to the anode.

As shown in FIG. 1, the pressure value measured by the pressure sensor 20 may be pressure P2 between the hydrogen supply valve 10 and the ejector 30 and the pressure of the rear end of the ejector 30 may be equal to that of the anode. The pressure of the anode may be denoted by P3. Meanwhile, when the hydrogen supply valve 10 is opened, the pressure value P2 measured by the pressure sensor 20 is different from the pressure P3 of the anode. However, when the hydrogen supply valve 10 is closed, the pressure value P measured by the pressure sensor 20 is equal to that of the anode.

A relationship between the pressure P3 of the anode and the measured value P2 of the pressure sensor 20 on the front end of the nozzle of the ejector 30 will be described in greater detail with reference to FIG. 2. In general, as the hydrogen supply valve 10 is opened, high-pressure hydrogen gas stored in the pressure vessel may be supplied to the ejector 30 side and hydrogen gas may be sprayed to the anode through the nozzle of the ejector 30. In particular, the pressure P3 of the anode may be decreased compared to the pressure P2 of the front end of the nozzle of the ejector 30.

Figure 2:
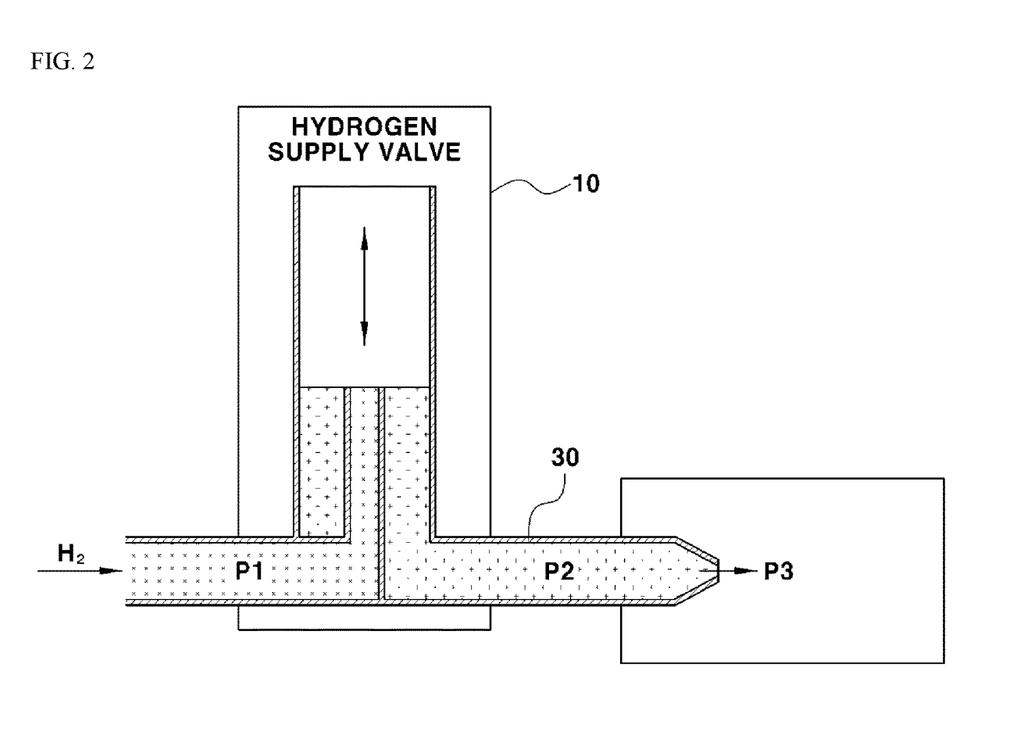
FIG. 2 is a view conceptually showing the pressure states of the front and rear ends of a nozzle of an ejector to illustrate a relationship between the pressure of the front end of the nozzle of the ejector and the pressure of an anode according to an exemplary embodiment of the present disclosure.

In contrast, FIG. 2 shows a state in which the hydrogen supply valve 10 is closed. As shown in FIG. 2, when a plunger in the hydrogen supply valve moves downward, the hydrogen supply valve 10 may be closed and hydrogen supply may be stopped. Particularly, the pressure P2 of the rear end of the hydrogen supply valve 10 and the front end of the nozzle of the ejector 30 is less than the pressure P1 of the front end of the hydrogen supply valve 10. Meanwhile, when a predetermined time has elapsed when the hydrogen supply valve 10 is closed, the pressure P2 of the rear end of the hydrogen supply valve 10 and the front end of the nozzle of the ejector 30 becomes equal to the pressure of the rear end of the nozzle of the ejector 30, that is, the pressure P3 of the anode.

In the exemplary embodiment of the present disclosure, since the pressure of the front end of the nozzle of the ejector 30 and the pressure of the rear end of the nozzle of the ejector 30 become equal when the hydrogen supply valve 10 is closed, the pressure P3 of the anode may be estimated from the pressure P2 of the front end of the nozzle of the ejector 30 measured by the pressure sensor 20 and the amount of supplied hydrogen may be determined. Specifically, in the present disclosure, a method of measuring the pressure P2 between the rear end of the hydrogen supply valve 10 and the front end of the nozzle of the ejector 30 to adjust the amount of supplied hydrogen is proposed instead of a method of directly measuring the pressure of the anode to adjust the amount of supplied hydrogen.

In the exemplary embodiment of the present disclosure, the method of selecting the target pressure of the anode according to the required output of the fuel cell system may be equal to the method of selecting the target pressure of the anode in the conventional system. In the present disclosure, the pressure P2 between the rear end of the hydrogen supply valve 10 and the front end of the nozzle of the ejector 30 may be measured and the current pressure P3 of the anode may be estimated from the measured pressure P2. In addition, in the exemplary embodiment of the present disclosure, the amount of hydrogen required to reach the target pressure of the anode may be calculated based on the estimated pressure of the anode and then the opening degree of the hydrogen supply valve 10 may be adjusted based on the amount of hydrogen required. Accordingly, the pressure of the front end of the ejector 30 and the amount of supplied hydrogen may be adjusted using the estimated pressure of the anode.

Figure 3:
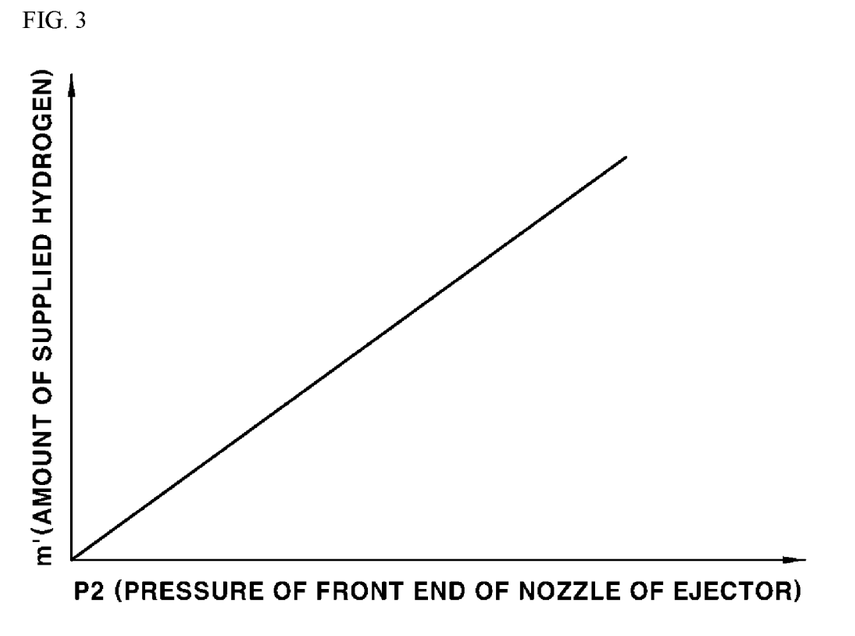
FIG. 3 is a schematic view showing a relationship between the pressure of the front end of the nozzle of the ejector and the amount of supplied hydrogen according to an exemplary embodiment of the present disclosure.

As shown in FIG. 3, the flow rate of hydrogen supplied by the ejector may be determined by the pressure P2 of the front end of the nozzle of the ejector. The flow rate of hydrogen supplied by the ejector may be proportional to the pressure P2 of the front end of the nozzle of the ejector according to a constant slope. In other words, as shown in FIG. 3, the pressure P2 of the rear end of the hydrogen supply device and the front end of the hydrogen spraying device, that is, the front end of the ejector, is proportional to the flow rate of supplied hydrogen m' according to a constant slope, and may be expressed by "Y=aX", wherein a is a constant, X is the pressure between the front end of the hydrogen supply device and the front end of the hydrogen spraying device (ejector), and Y is the amount of hydrogen supplied to the anode.

Figure 4:
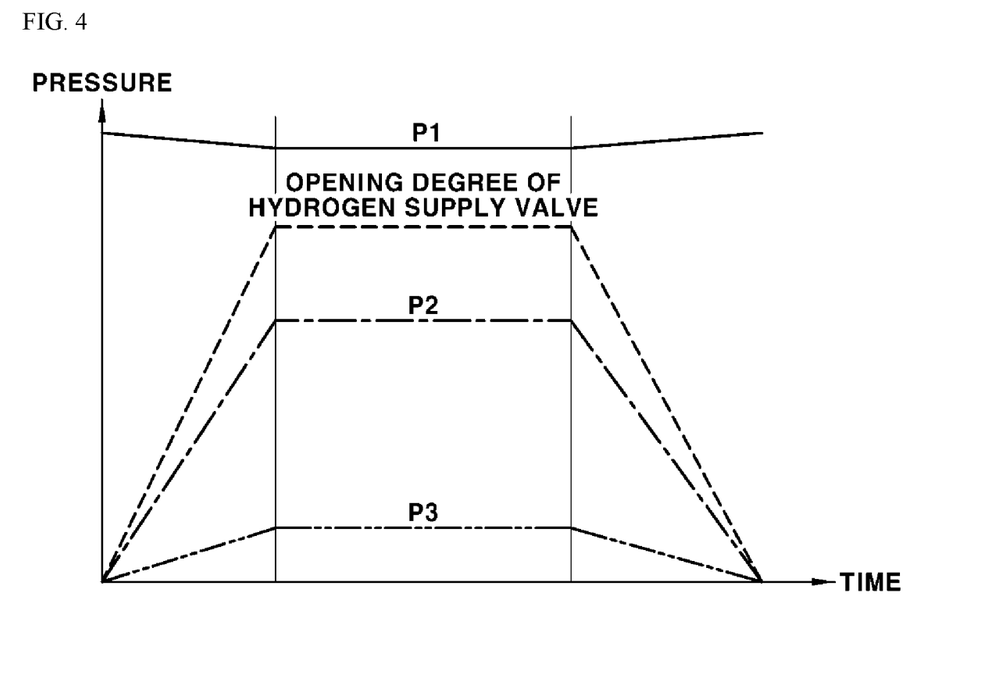
FIG. 4 is a view showing change in pressure of each position according to an opening degree of a hydrogen supply valve according to an exemplary embodiment of the present disclosure.

FIG. 4 is a view showing change in pressure of each position according to an opening degree of a hydrogen supply valve. As shown in FIG. 4, as the opening degree of the hydrogen supply valve changes, the pressure P2 between the rear end of the hydrogen supply valve and the front end of the nozzle of the ejector and the current pressure P3 of the anode may increase or decrease.

In the exemplary embodiment of the present invention, mapping data of the amount of supplied hydrogen based on a linear relationship between the pressure P2 of the front end of the nozzle of the ejector and the amount of supplied hydrogen may be stored in the fuel cell system. The mapping data may be stored in the controller of the fuel cell system.

Hereinafter, a hydrogen supply control method of a fuel cell system according to an exemplary embodiment of the present disclosure will be described in detail with reference to the flowcharts of FIGS. 5 and 6. In the exemplary embodiment of the present disclosure, the hydrogen supply control method of the fuel cell system including the hydrogen supply valve, the hydrogen spraying device, the controller configured to open and close the hydrogen supply valve and the pressure sensor configured to measure pressure between the rear end of the hydrogen supply valve and the front end of the hydrogen spraying device is proposed.

Figure 5:
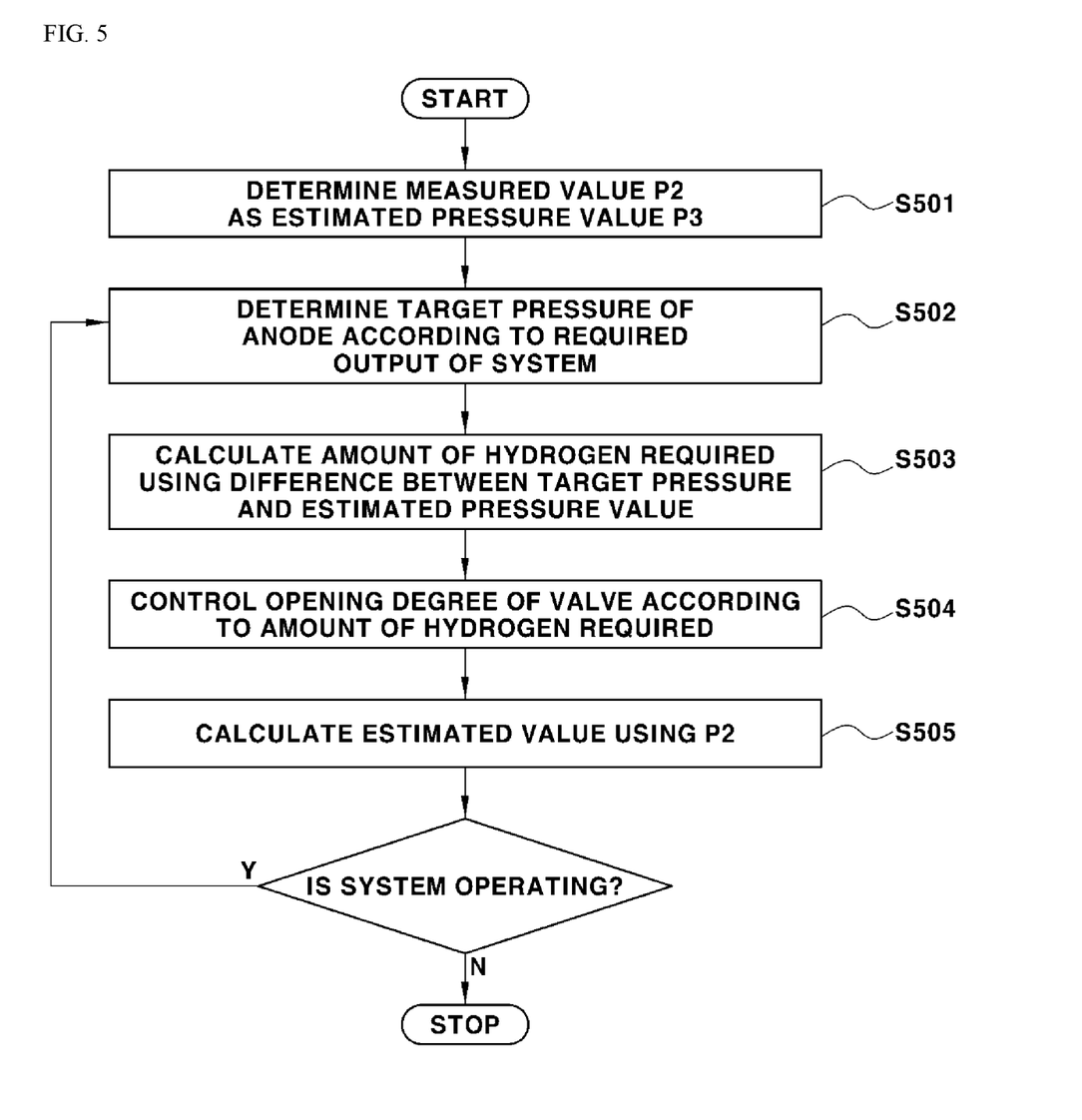
FIG. 5 is a flowchart illustrating a hydrogen supply control method of a fuel cell system according to an exemplary embodiment of the present disclosure.

Particularly, in the exemplary embodiment of the present disclosure, as shown in FIG. 5, the controller may be configured to determine the measured value of the pressure sensor in a state of blocking the hydrogen supply valve (e.g., while the valve is closed) as the estimated pressure value (S501). In step S501, as shown in FIG. 2, when the pressure of the front end of the nozzle of the ejector and the pressure of the rear end of the nozzle of the ejector become equal by blocking closing the hydrogen supply valve, the measured value of the pressure sensor of the front end of the ejector may be determined as the estimated pressure value of the anode.

Thereafter, the controller may be configured to determine the target pressure of the anode based on the required output of the fuel cell system (S502). In this step, the target pressure of the anode capable of generating the output requested by the operator in the fuel cell stack 40 may be determined and has been generally used to control the fuel cell system, and thus a detailed description thereof will be omitted.

When the target pressure of the anode is determined, the controller may be configured to calculate the amount of hydrogen required to be supplied to the anode from a difference between the target pressure of the anode and the estimated pressure value of the anode (S503). In this step S503, the amount of hydrogen necessary to reach the target pressure may be calculated from the difference between the target pressure of the anode and the estimated pressure of the anode. The amount of hydrogen required may be calculated using an ideal gas state equation. In other words, since the controller may be configured to detect information regarding the volume of the anode and information regarding the temperature of the anode, when the difference between the target pressure of the anode and the estimated pressure of the anode is capable of being confirmed, it may be possible to calculate the amount of hydrogen necessary to reach the target pressure of the anode.

When the amount of hydrogen required is calculated, the controller may be configured to adjust the opening degree of the hydrogen supply valve based on the calculated amount of hydrogen required (S504). In step S504, the opening degree of the hydrogen supply valve may be adjusted to thus adjust the pressure of the front end of the ejector. Accordingly, the amount of supplied hydrogen may be adjusted based on the relationship between the pressure P2 of the front end of the ejector and the amount of supplied hydrogen.

For example, data regarding the amount of hydrogen supplied to the anode based on the pressure between the rear end of the hydrogen supply device and the front end of the hydrogen spraying device may be stored in the controller. In step S504, the opening degree of the hydrogen supply valve may be adjusted based on the data, and thus, the pressure value that corresponds to the calculated amount of hydrogen required may correspond to the measured value of the pressure sensor. Accordingly, the controller may be configured to adjust the opening degree of the hydrogen supply valve based on the calculated amount of hydrogen required, thereby adjusting the pressure of the front end of the hydrogen spraying device (e.g., the ejector).

Meanwhile, since the amount of hydrogen supplied through the ejector may be determined by the pressure P2 of the front end of the ejector as shown in FIG. 3, the amount of hydrogen supplied to the anode may be calculated by measuring the pressure P2 of the front end of the ejector. In particular, the pressure of the front end of the ejector is the measured pressure value of the pressure sensor and thus hydrogen may be supplied to the anode based on the measured pressure value as the hydrogen supply valve is opened. Accordingly, the amount of supplied hydrogen may be calculated by estimating the amount of supplied hydrogen based on the measured pressure value during the time elapsed after the hydrogen supply valve is opened (S505).

In other words, in step S505, the estimated pressure value of the anode may be newly calculated from the measured pressure value P2 of the pressure sensor, thereby updating the estimated pressure value of the anode (S505). Particularly, in step S505 of updating the estimated pressure value of the anode, the amount of hydrogen actually supplied to the anode may be calculated from the measured value of the pressure sensor and the elapsed time, and the estimated pressure value of the anode may be calculated from the difference between the amount of hydrogen required, which is previously calculated in step S503, and the amount of actually supplied hydrogen, which is calculated in step S505. The estimated pressure value may be calculated by the ideal gas state equation as in step S502 and the estimated pressure value of the anode may be updated by the estimated pressure value of the anode.

The process of estimating the pressure of the anode, including steps S502 to S505, may be repeatedly performed during the operation of the fuel cell system. Accordingly, after step S505 of updating the estimated pressure value of the anode, whether the fuel cell system is operating may be detected. When the fuel cell system is operating, a series of steps including step S502 of determining the target pressure of the anode to step S505 of updating the estimated pressure value of the anode may be repeatedly performed.

In addition, the controller may be configured to obtain information regarding the amount of hydrogen crossing over into the anode and the amount of hydrogen consumed in the anode, and the amount of hydrogen crossing over into the anode and the amount of hydrogen consumed in the anode may be used to more accurately estimate the pressure of the anode. In other words, since the amount of hydrogen actually supplied to the anode may be obtained by excluding the amount of hydrogen crossing over into the anode and the amount of hydrogen consumed in the anode from the amount of actually supplied hydrogen, (the amount of actually supplied hydrogen—the amount of hydrogen crossing over into the anode—the amount of hydrogen consumed in the stack) is used as the amount of hydrogen actually supplied to the anode, thereby calculating and updating the estimated pressure value of the anode.

Figure 6:
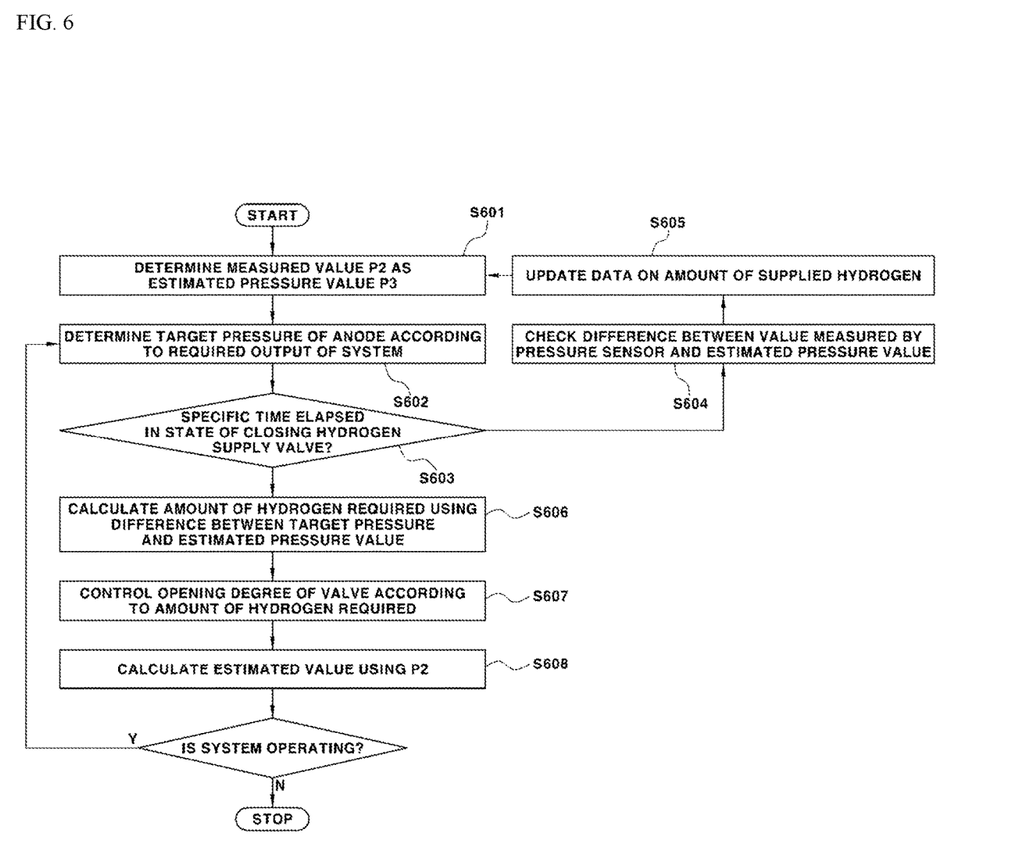
FIG. 6 is a flowchart illustrating a hydrogen supply control method of a fuel cell system according to another exemplary embodiment of the present disclosure.

Meanwhile, FIG. 6 is a flowchart illustrating a hydrogen supply control method of a fuel cell system according to another exemplary embodiment of the present disclosure. The example of FIG. 6 is equal to the example of FIG. 5 except that steps of updating data regarding the pressure of the front end of the ejector and the amount of supplied hydrogen are performed while the hydrogen supply valve is closed for a predetermined time or greater as in the case of stopping a vehicle.

Accordingly, even in the example of FIG. 6, step S601 of determining the measured value of the pressure sensor as the estimated pressure value in a state of blocking the hydrogen supply valve, step S602 of determining the target pressure of the anode based on the required output of the fuel cell system, step S606 of calculating the amount of hydrogen required to be supplied to the anode from the difference between the target pressure of the anode and the estimated pressure value of the anode, step S607 of adjusting the opening degree of the hydrogen supply valve based on the calculated amount of hydrogen required, and step S608 of updating the estimated pressure value of the anode by newly calculating the estimated pressure value of the anode from the measured value of the pressure sensor and the time elapsed after opening the hydrogen supply valve are included.

In contrast, according to the present exemplary embodiment, step S603 of detecting whether a predetermined time has elapsed when the hydrogen supply valve is closed may be performed. When the hydrogen supply valve is closed for the predetermined time or greater, the pressure P2 of the front end of the ejector becomes equal to the pressure P3 of the anode. Therefore, when the pressure value of the front end of the ejector measured by the pressure sensor is used, it may be possible to more accurately estimate the pressure of the anode at the corresponding point in time.

Meanwhile, the errors of the estimated pressure value of the anode may be continuously accumulated due to nozzle size errors, control speed errors, etc. during driving. Accordingly, in the present exemplary embodiment, when the pressure of the front end of the ejector and the pressure of the rear end of the ejector become equal as in the case of stopping the vehicle, the value measured by the pressure sensor and the estimated pressure value of the anode may be compared (S604) and the data may be updated based on the difference between the value measured by the pressure sensor and the estimated pressure value of the anode (S605). For example, when there is no required output during operation of the fuel cell system, hydrogen supply is not necessary and thus the hydrogen supply valve may be closed. By replacing the estimated pressure value of the anode with the measured pressure value of the front end of the nozzle of the ejector when a specific time has elapsed after closing the hydrogen supply valve, it may be possible to omit calculation errors occurring during operation.

As described above, the data regarding the pressure of the front end of the ejector and the amount of supplied hydrogen may be defined in a linear relationship and thus the updated data may be determined by the following equation using a ratio of the measured value of the pressure sensor to the estimated pressure value of the anode as a coefficient.

$$Y=aX*(Pm/Pe) \qquad \text{Equation 1}$$

wherein, a denotes a constant, X denotes the pressure between the rear end of the hydrogen supply device and the front end of the hydrogen spraying device, Y denotes the amount of hydrogen supplied to the anode, Pm denotes the measured value of the pressure sensor, and Pe denotes the estimated pressure value of the anode.

By the above-described hydrogen supply control method of the fuel cell system, even when a separate pressure sensor configured to measure the internal pressure of the anode is omitted, it may be possible to accurately adjust the amount of supplied hydrogen from the measured pressure value of the pressure sensor installed between the rear end of the hydrogen supply valve and the front end of the hydrogen spraying device.

In the hydrogen supply control method of the fuel cell system according to the present disclosure, even when the pressure sensor is omitted in the humid environment of the anode, since it may be possible to accurately adjust the amount of supplied hydrogen, it may be possible to improve the durability of the pressure sensor and a special pressure sensor for use in a humid environment may be omitted. According to the present disclosure, it may be possible to improve and continuously maintain accuracy of the pressure sensor, by periodically updating the mapping data of the pressure sensor.

The invention has been described in detail with reference to exemplary embodiments thereof. However, it will be appreciated by those skilled in the art that the present invention may be implemented in various modifications and alterations via, for example, addition, change or omission of constituent elements without departing from the principles and spirit of the invention, and these modifications and alterations are within the scope of the present invention.

What is claimed is:

1. A hydrogen supply control method of a fuel cell system including a hydrogen supply valve, a hydrogen spraying device, a controller configured to open and close the hydrogen supply valve, and a pressure sensor configured to measure pressure between a rear end of the hydrogen supply valve and a front end of the hydrogen spraying device, the hydrogen supply control method comprising:
   determining, by the controller, a measured pressure value of the pressure sensor in a state of closing the hydrogen supply valve as an estimated pressure value of an anode;
   determining, by the controller, target pressure of the anode based on required output of the fuel cell system;
   calculating, by the controller, an amount of hydrogen required to be supplied to the anode from a difference between the target pressure of the anode and the estimated pressure value of the anode;
   adjusting, by the controller, an opening degree of the hydrogen supply valve based on the calculated amount of hydrogen required in a state of opening the hydrogen supply valve; and
   updating, by the controller, the estimated pressure value of the anode, by newly calculating the estimated pressure value of the anode from the measured pressure value of the pressure sensor and an elapsed time after the hydrogen supply valve is opened;
      wherein data on the amount of hydrogen supplied to the anode based on the pressure between the rear end of the hydrogen supply device and the front end of the hydrogen spraying device is stored in the controller, and wherein the adjusting of the opening degree of the hydrogen supply valve includes;
      adjusting, by the controller, the opening degree of the hydrogen supply valve to adjust the pressure of the front end of the hydrogen spraying device such that the pressure value corresponding to the calculated amount of hydrogen required corresponds to the measured pressure value of the pressure sensor, based on the data.

2. The hydrogen supply control method of claim 1, further comprising:
   detecting, by the controller, whether the fuel cell system is operating after updating the estimated pressure value of the anode.

3. The hydrogen supply control method of claim 2, wherein when the fuel cell system is operating, the determining of the target pressure of the anode to the updating of the estimated pressure value of the anode are repeatedly performed.

4. The hydrogen supply control method of claim 1, wherein the updating of the estimated pressure value of the anode includes:

calculating, by the controller, an amount of hydrogen actually supplied to the anode from the measured value of the pressure sensor and the elapsed time;

calculating, by the controller, the estimated pressure value of the anode from a difference between the calculated amount of hydrogen required and the amount of actually supplied hydrogen; and updating, by the controller, the estimated pressure value of the anode.

5. The hydrogen supply control method of claim 1, wherein the pressure of the rear end of the hydrogen supply device and the front end of the hydrogen spraying device and the amount of hydrogen supplied to the anode are stored in the controller with a linear relationship.

6. The hydrogen supply control method of claim 1, wherein the hydrogen spraying device is an ejector, and wherein the pressure sensor is configured to measure pressure between a rear end of the hydrogen supply valve and a front end of a nozzle of the ejector.

7. The hydrogen supply control method of claim 4, further comprising:

obtaining, by the controller, information regarding an amount of hydrogen crossing over into the anode and an amount of hydrogen consumed in the anode; and updating, by the controller, the estimated pressure value of the anode by calculating the estimated pressure value of the anode using (the amount of actually supplied hydrogen—the amount of hydrogen crossing over into the anode—the amount of hydrogen consumed in a stack) as the amount of hydrogen actually supplied to the anode.

8. The hydrogen supply control method of claim 1, further comprising:

comparing, by the controller, the measured pressure value of the pressure sensor with the estimated pressure value of the anode; and updating, by the controller, the data based on a difference between the measured pressure value of the pressure sensor and the estimated pressure value of the anode, when a predetermined time has elapsed in a state of closing the hydrogen supply valve.

9. The hydrogen supply control method of claim 8, wherein the data stored in the controller has a linear relationship between the pressure between the front end of the hydrogen supply device and the front end of the hydrogen spraying device and the amount of hydrogen supplied to the anode, and wherein the data is updated according to the following equation:

$$Y = aX * (Pm/Pe)$$

wherein, a denotes a constant, X denotes the pressure between the rear end of the hydrogen supply device and the front end of the hydrogen spraying device, Y denotes the amount of hydrogen supplied to the anode, Pm denotes the measured pressure value of the pressure sensor, and Pe denotes the estimated pressure value of the anode.

* * * * *